United States Patent [19]

Bolen et al.

[11] 4,349,590

[45] Sep. 14, 1982

[54] GLASS SUBSTRATES WITH AN INSOLUBILIZED ASPHALT COATING

[75] Inventors: Charles E. Bolen, Heath; Edward R. Harrington, Newark; Alfred Marzocchi, Newark; Michael G. Roberts, Newark, all of Ohio

[73] Assignee: Owens-Corning Fiberglas Corporation, Toledo, Ohio

[21] Appl. No.: 248,089

[22] Filed: Mar. 30, 1981

[51] Int. Cl.$^3$ ............................................. B05D 3/02
[52] U.S. Cl. ................................. 427/389.7; 65/3.4; 65/3.42; 106/277; 106/279; 106/281 R; 427/389.8; 427/443; 428/268; 428/291; 428/292; 428/440
[58] Field of Search ............... 106/281 R, 273 R, 276, 106/279, 277, 274, DIG. 7, 282, 283, DIG. 8; 427/389.8, 387, 384, 138; 428/406, 403, 268, 291, 392, 440; 252/311.5; 208/39, 44, 45, 22; 65/3.42, 3.4; 156/337

[56] References Cited

U.S. PATENT DOCUMENTS

| | | | |
|---|---|---|---|
| 2,701,777 | 2/1955 | Farris | 427/389.7 X |
| 2,712,506 | 7/1955 | Farris | 106/277 |
| 2,771,387 | 11/1956 | Kleist et al. | 428/285 |
| 2,811,769 | 11/1957 | Craig | 28/72.3 |
| 3,440,195 | 4/1969 | Norcross | 260/285 |
| 3,997,355 | 12/1976 | Santucci et al. | 106/282 X |
| 4,166,752 | 9/1979 | Marzocchi et al. | 106/273 N |
| 4,175,978 | 11/1979 | Marzocchi et al. | 106/281 R |
| 4,186,236 | 1/1980 | Heitmann | 428/291 |
| 4,211,575 | 7/1980 | Burris | 106/274 |
| 4,225,353 | 9/1980 | Beaudoin et al. | 106/275 |
| 4,285,734 | 8/1971 | Marzocchi et al. | 106/273 R |

FOREIGN PATENT DOCUMENTS 2842355 9/1979 Fed. Rep. of Germany .
519549 3/1940 United Kingdom .

Primary Examiner—Thurman K. Page
Attorney, Agent, or Firm—Ronald C. Hudgens; Robert F. Rywalski

[57] ABSTRACT

Glass substrates are provided, for example, glass fibers, with a substantially solvent insoluble coating of asphalt.

6 Claims, No Drawings

GLASS SUBSTRATES WITH AN INSOLUBILIZED ASPHALT COATING

FIELD OF THE INVENTION

The present invention is related to glass manufacturing and, more particularly, it is directed to providing a coating on glass substrates. Even yet more particularly, it is directed to forming coatings on glass fibers.

BACKGROUND

Textile-type glass fibers have been manufactured for many years. In producing continuous strand type textile fiber glass, a plurality of individual or monofilament, glass fibers, substantially comtemporaneous with forming, are in a converging manner brought into contact with an applicator wherein a size is applied to the glass fibers. Subsequent to the application of the size, the strand of individual glass fibers is then wound by suitable winding means into a package and the package is dried. Such fibers are typically employed for numerous reinforcement purposes. In one typical use of such fibers, after drying the fibers are chopped, into so-called chopped strands, and these chopped strands are converted into an aqueous slurry and applied to a paper type forming machine. The water is then removed and an appropriate binder is applied to the de-watered blanket of fibers. Such binder is a thermosettable polymer and is heated to cure it. The resulting product is termed a wet process mat and finds numerous applications. If desired, such wet process mat may then be coated or impregnated with asphalt and this product finds utility in the roofing industry. Alternatively, instead of applying a thermosetting binder, the chopped strands, after removal of water, may be coated with asphalt.

While asphalt itself has many desirable properties, especially its low cost, when it is employed as a size in the production of continuous strands of glass fibers, this asphalt is highly soluble in various solvents. Consequently, such use of asphalt as a size is not satisfactory. Similarly, when asphalt is employed with, for example, wet process mat to produce a reinforcement for roofing applications, that asphalt likewise is solvent soluble, thus handicapping some of its utility and methods of application.

In German Offenlegungsschrift No. 28 42 355, a chemically modified asphalt is taught. This chemically modified asphalt is the reaction product of asphalt, a vinyl aromatic monomer, for example, styrene, and a rubber. This publication teaches that when glass fibers are coated with such a chemically modified asphalt, the material can be insolubilized by an optional heating step carried out at temperatures in the range of about 200° to 500° F. (93° to 260° C.). Unfortunately, however, it will be appreciated that because of the chemical reaction which is needed to obtain the chemically modified asphalt, the cost of that material is increased relative to an asphalt which has not been chemically modified and, additionally, the materials used, i.e., the rubber and styrene, are commonly more expensive than asphalt. Consequently, the obtainment of the insolubilized chemically modified asphalt coating is penalized because of cost considerations.

SUMMARY

Applicants have surprisingly found that a conventional asphalt may be applied to glass substrates, for example, glass fibers, and can then be converted to a substantially insolubilized form. Also quite surprisingly it has been found that when such asphalt is directly applied to glass fibers, for example, substantially contemporaneous with the forming operation, and then converted to the insolubilized form, such form of asphalt has a tenaceous bond with the glass fibers without the use of any conventional coupling agents.

Thus, in accordance with the present invention, a process is provided which comprises applying asphalt to a glass substrate and then heating the asphalt for a sufficient period of time to convert said asphalt from a substantially solvent soluble form to a substantially insolubilized form. The asphalt may be employed as a binder in previous methods for producing wet process mat, or it may be employed as the size in previously practiced techniques for size applications to glass fibers. Such fibers with the insolubilized asphalt formed thereon can be employed as reinforcements for numerous substances, especially the thermosettable resins like the polyesters.

DESCRIPTION OF THE INVENTION

Asphalt as contemplated in the practice of the present invention may be applied to glass fibers using any of the techniques previously employed in the past. Thus, for example, asphalt may be applied to glass fibers substantially contemporaneous with the forming operation by using applicator techniques employed in the past for applying sizes to freshly formed glass fibers. Similarly, in, for example, the production of wet process mat, the asphalt may be applied using techniques previously employed for supplying the binder to such wet process mat or for saturating such mats with asphalt.

Previously, it was indicated that conventional asphalt is highly susceptible to solvent attack. Such solvents which attack asphalt include, for example, toluene, hexane, methylene chloride, Stoddard solvent, aqueous sodium hydroxide solutions, and concentrated and dilute hydrochloric acid. By practicing the teachings of this invention, asphalt can surprisingly be converted into an insolubilized form. Thus, for example, with respect to toluene and methylene chloride the present invention produces an asphalt which is virtually insoluble, i.e., after 30 days of immersion there is substantially no detectable solubility.

As used herein, the term asphalt, means asphalts which are free of rubber and are non-chemically modified. That is, they are conventional asphalts and not asphalts which have been combined with rubber or reacted with asphalt reactive materials, such as, for example, vinyl aromatics and rubber. Preferably, the asphalts for use herein are the air blown asphalts as well as asphalt flux. Representative air blown asphalts include AC-20, AC-10 and AC-5. Such asphalts are most desirably applied as an aqueous emulsion and the emulsion may be produced by techniques well known in the art. More conveniently, however, any of the numerous commercially available emulsions will be employed. Such emulsions are exemplified by those commercially available from the Koppers Chemical Company under their designation CRS-1 emulsion or their RS-1 emulsion. Another suitable emulsion is that available from Byerlite under their designation K-1-C. The emulsions employed in the practice of this invention may be either anionic, cationic or nonionic. As will be readily apparent, such emulsions will include the dispersed asphalt, water and an appropriate liquid emulsifying agent. Preferably, a glass lubricant will be added to these emulsions. One such suitable lubricant is an acetic acid stabilized reaction product of tetraethylene pentamine and stearic acid. Other suitable lubricants include sulfonated mineral oils, polyoxyethylene stearates adn oleates, sorbitan stearates and oleates, as well as isostearates.

Suitably, the emulsions which are applied will contain about 60 percent to about 98.5 percent (by weight) water. As applied, desirably the asphalt content of the emulsion will be about 1 percent to about 38.5 percent. The remainder of the asphalt emulsion will include an emulsifying agent present in an amount sufficient to emulsify the asphalt, for example, a cationic, anionic or nonionic surfactant, and preferably a lubricant. The lubricant will desirably be present in an amount of about 0.05 percent to about 1.0 percent (based on the total weight of emulsion). Generally, the non-aqueous portion of the emulsion will contain about 1 percent to about 10 percent of the above-described materials. Usually, the emulsion will be applied so that the final thickness on the glass is less than about 300 mils, desirably less than about 100 mils, and more desirably about 10 mils or less. In order to enhance the properties of the final insolubilized form of asphalt, it is desirable to include sulphur in the emulsion. Fine results are obtained by employing a weight ratio of sulphur to asphalt between about 1.5:1.0 to about 1:20. Such sulphur serves to increase the bonding (crosslink) density and further reduces solubility in organic solvents.

After application of the asphalt to glass fibers, the water is suitably removed, as, for example, by drying, and then the solvent soluble asphalt coating is heated for a sufficient period of time and at a sufficient temperature to convert the asphalt to a substantially insolubilized form. This heating is done in the presence of a free oxygen containing gas, preferably air, and preferably is done at a temperature of at least about 140° C. for a period of time of at least about 50 hours. Thus, outstanding insolubilized asphalt coatings having a thickness of less than 300 mils have been obtained, for example, by heating asphalt of about 190° C. for about three days and at about 170° C. for about five days. Such insolubilized form of asphalt showed tenaceous bonding to glass fibers when applied as a size, notwithstanding the fact that no coupling agent was employed.

While the foregoing describes the present invention, it will, of course, be apparent that modifications are possible which, pursuant to the Patent Statutes and Laws, do not depart from the spirit and scope of the present invention.

We claim:

1. A process which comprises applying a rubber-free, non-chemically modified, asphalt to a glass substrate, heating said asphalt for a sufficient period of time to convert said asphalt to a substantially insolubilized form wherein said heating is done in the presence of a free oxygen containing gas at a temperature of at least about 140° C. for a period of time of at least about 50 hours.

2. The process of claim 1 wherein said heating is done at at least about 190° C. for about at least three days.

3. The process of claim 1 wherein said glass substrate is a substantially freshly formed glass fiber and said asphalt is applied as an asphalt emulsion directly thereto.

4. The process of claim 1 wherein said heating is done for at least about five days at a temperature of at least about 170° C.

5. The process of claim 1 wherein said asphalt is selected from the group consisting of asphalt flux, air blown asphalt and mixtures thereof.

6. The process claim 3 wherein said asphalt emulsion includes sulfur.

* * * * *